C. A. WRIGHT.
Lawn-Mower.

No. 208,355. Patented Sept. 24, 1878.

Witnesses:
Roger M. Sherman
John Galwey

Inventor
Charles A. Wright
by Geo. Terry
Atty

UNITED STATES PATENT OFFICE.

CHARLES A. WRIGHT, OF NEW HAVEN, CONNECTICUT, ASSIGNOR OF ONE-HALF HIS RIGHT TO GEORGE B. WRIGHT, OF SAME PLACE.

IMPROVEMENT IN LAWN-MOWERS.

Specification forming part of Letters Patent No. 208,355, dated September 24, 1878; application filed June 14, 1878.

*To all whom it may concern:*

Figure 1:
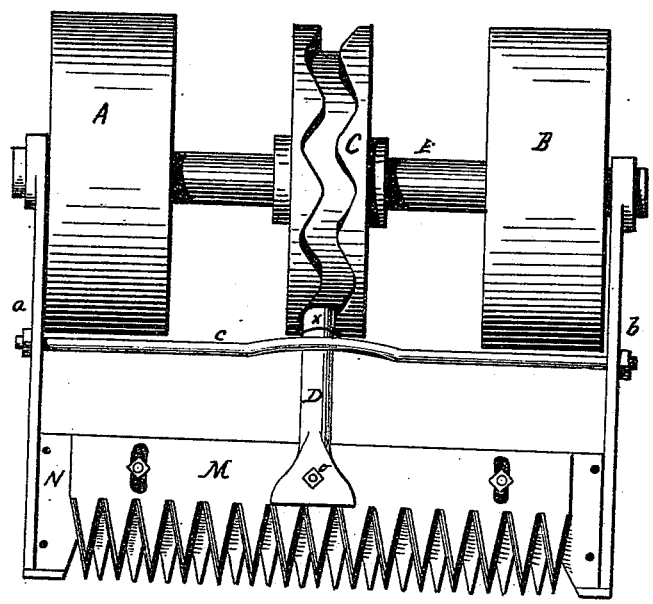
Figure 2:
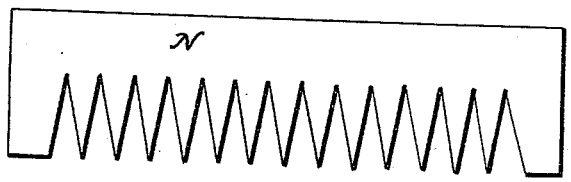
Figure 3:
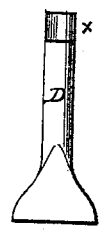

Be it known that I, CHARLES A. WRIGHT, of New Haven, county of New Haven, and State of Connecticut, have invented certain new and useful Improvements in Lawn-Mowers, of which the following is a specification:

Figure 1 is a front view of the mower. Fig. 2 is a view of the bottom plate; and Fig. 3, a view of the rod, with its roller, connecting the top plate with the cam.

My invention relates to lawn-mowers, its object being to produce a more easily-cutting instrument.

The invention consists in pivoting the upper knife-plate to the bottom plate or cross-bar, and in a new arrangement of parts for giving motion to the knife-plate.

In Fig. 1, $a$ and $b$ are the sides of the frame, and are connected together by the rod $c$ and by the plate N. Their front ends are turned up slightly; or small wheels may be attached to the ends, in the usual way. The rear ends are provided with boxes, in which the shaft E turns. To the sides $a$ and $b$ the handles are attached, in the usual way. The driving-wheels A and B are like wheels with broad faces, and are rigidly attached to the shaft E. The cam C is arranged on the same shaft, and is of the same diameter as the wheels A and B, and has a serpentine groove on its edge or face, which gives the end of the rod D a lateral motion back and forth as the cam rotates.

The plate M is made of sheet-steel, triangular pieces being cut out of its front edge to form triangular-shaped knives, which are beveled and brought to an edge on their lower side.

The plate N is made of the same material, and the knives are made in the same way, only the cutting-edges are on their upper sides, and the ends of the plate are fastened to the sides $a$ and $b$ of the frame.

The knives in the plates M and N may be separate pieces fastened to a cross-piece, and fingers or guards may be substituted for knives in the lower plate, as in the common mower. The top plate, M, is pivoted by the bolt $o$ to the lower plate, N, and is free to turn on the same. The rod D has one of its ends flattened, the flattened end being riveted to the top plate, M. The other end is provided with a roller fitting loosely into the cam C. The mower being constructed as above described, as the cam C rotates it gives a lateral motion back and forth to the roller end of the rod D, which causes the plate M to turn on the bolt $o$ and close the spaces between the knives on the two plates, as the space in an open pair of shears is closed by the turning of the blades on the pivot of the shears.

Other devices may be substituted for the cam to impart motion to the plate M without departing from the spirit of my invention.

Having described my invention and the mode of its operation, what I claim as new, and desire to secure by Letters Patent, is—

1. The driving-wheels A and B and cam C, arranged between them on the same shaft E, in combination with the knife-plates M and N, the plate M being pivoted near its center to the plate N by the bolt $o$, and rod D, provided with the roller $x$, all the said parts constructed and combined as shown and set forth.

2. The plate M, provided with knives, as described, pivoted to the plate N by the bolt $o$, and arranged to vibrate in a small arc of a circle, as shown and set forth.

CHARLES A. WRIGHT.

Witnesses:
 GEORGE B. WRIGHT,
 GEORGE TERRY.